United States Patent [19]

Mueller et al.

[11] 4,373,039
[45] Feb. 8, 1983

[54] ELASTOMER COATED FILLERS AND COMPOSITES THEREOF COMPRISING AT LEAST 60% BY WT. OF A HYDRATED FILLER AND AN ELASTOMER CONTAINING AN ACID SUBSTITUENT

[75] Inventors: William A. Mueller, Glendale; John D. Ingham, La Crescenta; William W. Reilly, Altadena, all of Calif.

[73] Assignee: The United States of America as represented by the Administrator of the National Aeronautics and Space Administration, Washington, D.C.

[21] Appl. No.: 158,530

[22] Filed: Jun. 11, 1980

[51] Int. Cl.³ .................. C08K 5/17; C08L 29/04; C08L 31/02
[52] U.S. Cl. ........................ 523/205; 524/436; 524/437; 524/503; 524/564; 524/786
[58] Field of Search ............... 260/42.14, 42.44, 42.49, 260/42.52; 523/205; 513/206–210; 524/564, 503, 786, 436, 437

[56] References Cited

U.S. PATENT DOCUMENTS

| | | | |
|---|---|---|---|
| 3,272,771 | 9/1966 | Busche et al. | 524/437 |
| 3,471,439 | 10/1969 | Bixler et al. | 524/586 |
| 3,922,442 | 11/1975 | North et al. | 428/389 |
| 3,926,873 | 12/1975 | Aishima et al. | 260/42.14 |
| 3,950,303 | 4/1976 | Lipscomb | 260/42.14 |
| 4,067,847 | 1/1978 | Yui et al. | 260/42.45 |
| 4,097,447 | 6/1978 | Howard | 260/42.46 |
| 4,107,258 | 8/1978 | Angell et al. | 524/265 |
| 4,187,210 | 2/1980 | Howard | 260/42.14 |
| 4,216,136 | 8/1980 | Stayner | 260/42.52 |
| 4,283,316 | 8/1981 | Bonsignore | 260/42.14 |
| 4,341,213 | 7/1982 | Cohen | 524/437 |

FOREIGN PATENT DOCUMENTS 2041960 9/1980 United Kingdom .
WO80/00448 3/1980 PCT Int'l Appl. .

OTHER PUBLICATIONS

Chem. Abst., vol. 93-47861, (1980), Nakae et al., (J55031871) Furukawa.
Chem. Abst., vol. 93-47833j, (1980), Noguchi et al., (J55023138) Furukawa.
Chem. Abst., vol. 90-24292f, (1979), Nagahama et al., (J53110644).
Chem. Abst., vol. 91-40413x, (1979), Nakae et al., (J79038344).
Derwent Abst. 22445 A/12, (J53012943), 2-6-78, Ashai Chem. Co.
Derwent Abst. 84048 Y/47, (J52123442), 10-17-77, Mitsubishi Petro.
Derwent Abst. 09587 A/05, (J52152948), 12-19-77, Idemitsu Petro.
Derwent Abst. 56947 B/31, (J54077658), 6-21-79, Mitsubishi Petro.
Derwent Abst. 79011 A/44, (J53110644), 9-27-78, Furukawa Elect.
Derwent Abst. 24542 C/14, (J55025405), 2-23-80, Furukawa Elect.
Derwent Abst. 29882 C/17, (J55034226), 3-10-80, Furukawa Elect.
Derwent Abst. 32741 A/18, (J53030651), 3-23-78, Showa Yuka.
Derwent Abst. 00896 Y/01, (J51132254), (Nov. 1976).
Derwent Abst. 22688 Y/13, (2-77), (J52021047).
Derwent Abst. 58335 Y/33, (7-2-77), (J52078948).

*Primary Examiner*—John C. Bleutge
*Assistant Examiner*—Herbert J. Lillin
*Attorney, Agent, or Firm*—P. McCaul; J. Manning

[57] ABSTRACT

The impact resistance of flame retardant composites, especially thermoplastic molding compounds containing over 60% hydrated mineral filler such as $Al(OH)_3$ or $Mg(OH)_2$ is improved by coating the filler with 1 to 20% of an elastomer. The composite will fail by crazing or shearing rather than by brittle fracture. A well bonded elastomeric interphase results by utilizing acidic substituted resins such as ethyl-hexyl acrylate-acrylic acid copolymers which bond to and are cross-linked by the basic filler particles. Further improvement in impact resistance is provided by incorporating 1 to 10% of a resin fiber reinforcement such as polyvinyl alcohol fibers that decompose to yield at least 30% water when heated to decomposition temperature.

9 Claims, 3 Drawing Figures

ELASTOMER COATED FILLERS AND COMPOSITES THEREOF COMPRISING AT LEAST 60% BY WT. OF A HYDRATED FILLER AND AN ELASTOMER CONTAINING AN ACID SUBSTITUENT

ORIGIN OF THE INVENTION

The invention described herein was made in the performance of work under a NASA contract and is subject to the provisions of Sections 305 of the National Aeronautics and Space Act of 1958, Public Law 83-568 (72 Statute 435; 42 U.S.C. 2457).

DESCRIPTION

1. Technical Field

The present invention relates to particulate fillers for imparting flame retardancy to resins and, more particularly, this invention relates to elastomeric coated, inorganic, water-releasing fillers particularly useful in flame-retardant thermoplastic molding compositions.

2. Background Art

Synthetic resins are finding increasing usage in vehicles and airplanes. However, a major hazard to occupants occurs during a fire due to quick ignition of these materials and the generation of toxic decomposition products and smoke preventing safe egress from the vehicle.

A general approach to flame resistance is to incorporate into the resin flame inhibiting additives such as phosphate, halogen, antimony and borate compounds. Though these additives significantly reduce flammability of resin systems, they generally produce more smoke and toxic gases than the unmodified materials when exposed to high temperature. This is extremely hazardous in transportation applications since the smoke and toxic gases generated may invade passenger areas not immediately involved in fire and prevent escape or rescue.

Hydrated minerals such as alumina trihydrate or magnesium hydroxide when compounded into resins at high levels above about 60% by weight impart both flame and smoke retardancy to resins by evolving non-toxic gases such as water to dilute the combustion products, reduce the fire load and promote char formation. However, the high level of filler loading significantly degrades the physical properties of the composite. Thermoplastic molding compounds become very brittle at high loading and have very poor impact resistance.

DISCLOSURE OF INVENTION

Physical properties of hydrated mineral fillers at high loading are significantly improved in accordance with this invention by coating the surface of the filler with an elastomer having a lower modulus than the binder resin. Impact resistance at high loadings is much higher since the fracture energy is dissipated at the elastomeric interphase allowing failure by shearing or crazing rather than by brittle fracture. A well bonded elastomeric interphase is formed between the filler and matrix resin by ionically cross-linking the elastomer to the filler particles.

Several methods may be utilized to apply the elastomeric coating to the mineral filler including application from solution or dispersion followed by evaporation of the solvent, radiation grafting or treatment of the filler with a reactive coupling agent followed by chemical grafting. However, it is difficult to control the uniformity and amount of elastomer coating and these methods are complex to process. The invention also relates to a simple and novel method of forming the elastomer on the surface of particular fillers. Since the surfaces of mineral fillers such as $Al(OH)_3$ and $Mg(OH)_2$ are basic, by incorporating acidic sites in the elastomer forming material, the elastomer ionically and firmly attaches to the surface of the filler and cross-links the polymeric material to provide elastomeric behavior. In fact, since the coating can be formed in situ during dispersion of the mineral filler in the matrix resin since the acidic material can be added and will selectively migrate to and attach and coat the surface of the filler.

Further improvement in impact resistance is provided incorporating a small amount, usually 1 to 10% by weight, of a reinforcing fiber that also evolves water endothermically upon heating. Polyvinyl alcohol fibers evolve up to 40% by weight of water during heating. A further advantage is that the fibers are lighter in weight than mineral fillers, an important consideration in transportation applications.

Another problem in forming fire-retardant resin composites containing a high level of mineral filler is that it is very difficult to form a uniform dispersion of the filler in the resin. The mixture is very sticky and requires a high level of mechanical energy input to the mixer and if the mixture rises to too high a temperature, the resin can degrade. However, the elastomer coated fillers of the invention form a low viscosity mixture with the matrix resin that can easily be formed into a uniform dispersion at low energy input.

The invention provides flame retardant resin compositions suitable for transportation applications from low cost light weight resins containing high levels of mineral fillers. The invention is particularly suited to maintaining the impact resistance properties of thermoplastic molding resins which can find use in fabricating seat components, wall and ceiling panels, storage compartments, doors, etc.

These and many other features and attendant advantages of the invention will become apparent as the invention becomes better understood by reference to the following detailed description when considered in conjunction with the accompanying drawings.

DETAILED DESCRIPTION OF THE INVENTION

Figure 1:
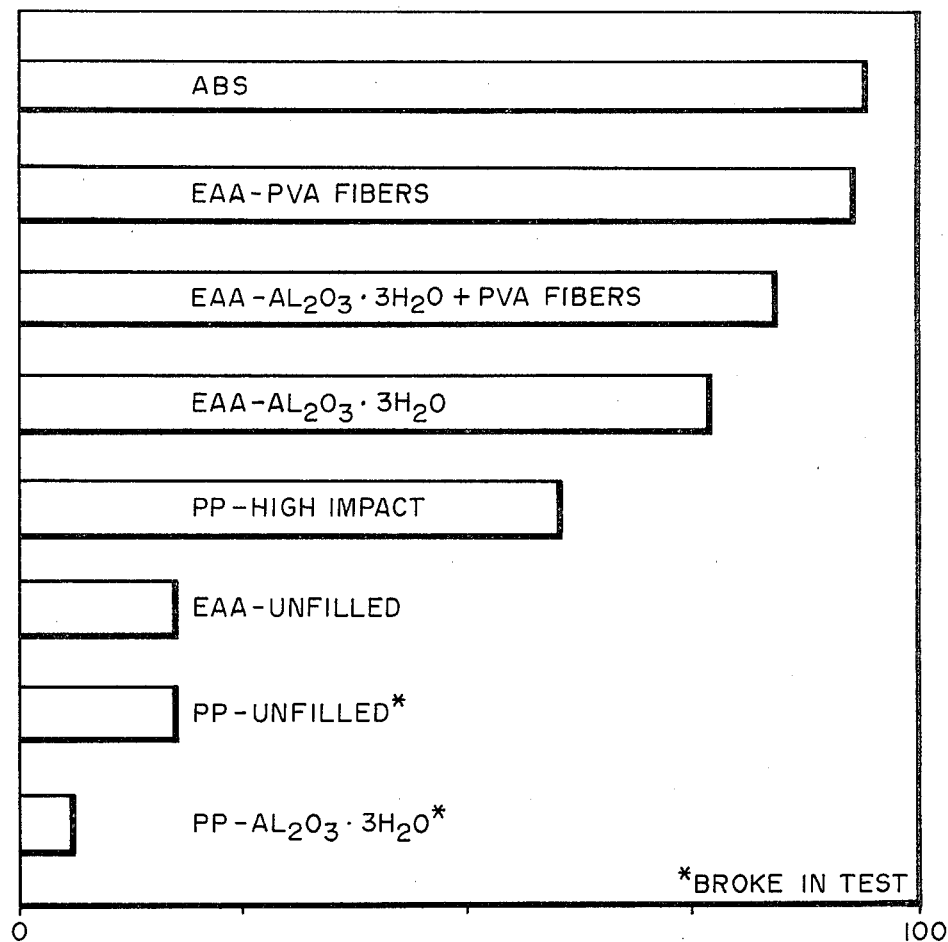
FIG. 1 is a series of bar graphs showing the relative impact resistance of various resin and resin composite materials.

The flame-retardant resin composites of the invention include at least 50% and preferably at least 60% by weight of relatively inert mineral fillers that endothermically evolve water coated with from 1 to 20% by weight based on filler of an elastomeric resin having a lower modulus than the matrix resin. The composite may optionally contain 1 to 10% by weight of a dispersion of reinforcing organic resin fibers that evolve at least 30% of their weight as water at low temperature.

Though the matrix resin can be rigid, thermosetting such as epoxies or polyesters ultra-high molecular weight polyolefins such as polyethylene or elastomers, the principal advantage of the invention is to provide higher impact resistance thermoplastic molding compositions from molding grade resins such as polypropylene (PP) or ethylene-acrylic acid (EAA) copolymers that have low smoke evolution.

The hydrated mineral fillers are those capable of emitting water at a temperature generally from above 200° C. to permit processing without decomposition and at a temperature below about 400° C. so that they decompose during a fire situation. Preferred fillers are basic in nature to provide cross-linking and attaching sites to elastomer coating materials containing acidic functional groups. Representative mineral fillers are $Al(OH)_3$ and $Mg(OH)_2$.

The fiber reinforcement should be formed of a resin insoluble in the matrix resin. Polyvinyl alcohol fibers (PVAF) are suitable. The fibers should be short in length generally from 0.1 to 10 mm, preferably to 5 mm and have a diameter from 0.1 to 10d.

The elastomer forming resin can have an acid substituent selected from phosphonic, sulfonic or carboxyl. Representative materials are sulfonated, chlorosulfonated or phosphonated polyolefins such as polyethylene. Preferred materials are $C_2$ to $C_{12}$ alkylacrylate-acrylic acid copolymers containing 1 to 15% by weight of acrylic acid. Terpolymers of ethylene, acrylic acid and vinyl acetate are also useable. The carboxyl groups of the acrylic acid ionically attach to the filler to form cross-links that insolubilize and immobilize the coating. The elastomeric properties are a result of the cross-linking.

Experiments illustrating the invention follow:

General molding grade polypropylene (PP, Exxon E-115) and ethylene-acrylic acid copolymer (EAA, Dow 459, 8% acrylic acid) were selected as matrix resins.

Fillers used included alumina trihydrate ($Al(OH)_3$, Alcoa 710), magnesium hydroxide ($Mg(OH)_2$, Marinco H, Merck) and chopped polyvinyl alcohol fibers (PVAF, Kuralon, Kuraray Co., Japan). Four sizes of the latter were used: 1d (11 microns)×1 mm, 1d×5 mm, 6d (25 microns)×1 mm, and 6d×5 mm. The fibers were not soluble in water. Thermogravimetric analysis showed the onset of decomposition of PVAF to be about 240° C., as compared with 230° C. for $Al(OH)_3$ and 260° C. for $Mg(OH)_2$. Surface areas of $Al(OH)_3$ and $Mg(OH)_6$ are 6-8 $m^2/g$ and 40-45 $m^2/g$, respectively. The material selected for use as a coating was a copolymer of 2-ethylhexyl acrylate containing 4 wt% acrylic acid comonomer. These monomers were polymerized in a 30% solution in benzene using 0.1 mol% benzoyl peroxide as initiator and heating for 24 hours at 60° C. Crude polymer was precipitated by adding to methanol, the separated polymer was dissolved in methylene chloride, and reprecipitated with methanol. Removal of solvent yielded 90% of a clear, soft, tacky material. Determination of molecular weight was attempted on a high pressure liquid chromatograph; however, the dilute polymer solution could not be filtered and was therefore not placed on the chromatographic column. The lack of filterability may be due to network formation by hydrogen bonding of the carboxyl groups in the non-polar solvent medium. The infrared spectrum of the copolymer showed the presence of carboxyl groups in about the same amount as the monomer mixture.

When a solution of the polymer was mixed with a small amount of $Al(OH)_3$ or $Mg(OH)_2$ and cast as a film, a rubbery sheet was obtained that was insoluble in the polymer solvents. The infrared spectrum of treated filler after exhaustive solvent extraction showed the filler surface to be coated with polymer. Furthermore, the carboxyl absorption was now absent, indicating formation of carboxylate salts with the filler surface. From these observations it may be inferred that cross-linking of the polymer and bonding to the filler surface occurs by formation of carboxylate salts between polymer and fillers. Fillers were treated with polymer by slurrying a solution of the polymer in toluene with the filler, evaporating the solvent under ambient conditions and then at 125° C. for a few hours, followed by dry blending in a Waring Blender.

Matrix resins and treated fillers were mixed in 50 g batches in a Brabender Plastograph at 200° C.–220° C., using a 5 minute mixing time. In most cases, the mineral filler level was 67 wt%. At this level, uncoated fillers could not be mixed with EAA; the mixture became too stiff and threatened to exceed the torque capability of the Plastograph. PVAF levels were 30 and 50 wt%; this filler was not treated other than drying 1 hour at 110° C. prior to use. After mixing, the specimens were cut into small pieces, and the mineral-filled ones were further reduced to coarse powders in a Waring Blender. The PVAF-filled samples were molded from small cut pieces; since their size was not reduced by dry blending. Samples were molded at 204° C. (400° F.). The mold was filled and put under a 3 ton load. When the temperature of the mold reached 176° C. (350° F.), he pressure was increased to 15 tons, held for 15 minutes, and the press was cooled without releasing the pressure. Molds for NBS smoke chamber data were 7.6 cm×7.6 cm×0.16 cm; for the impact test dimensions were 7.6 cm×1.27 cm×0.32 cm.

The rate of smoke release and total smoke production for the filled molding compounds were examined with an Aminco NBS Smoke Density Chamber. The radiant heater was set at a flux of 2.5 watts/$cm^2$. Flaming tests employed the multidirectional burner. The reliability of the smoke chamber was confirmed by testing calibrated paper supplied by the National Bureau of Standards.

Impact properties were measured with a pendulum device that simulates an Izod testing machine (cf. ASTM D256-56, Method C). Specimen dimensions and clamping geometry were identical to the standard test; however, the numerical results cannot be compared with the usual Izod impact values since the pendulum arrangements are not the same. The impact resistance was therefore compared with two materials having known values, high impact polypropylene (E803, Exxon) and ABS (Cyclolac GSE-1000, Borg-Warner).

Impact tests were run first, and only those specimens showing impact resistance between high impact PP and ABS were selected for smoke tests. Impact data on the mineral filled samples were presented in Table I and FIG. 1.

TABLE I

| | Impact Resistance of Various Resin-Filler Combustions | | |
|---|---|---|---|
| Resin | Filler (% Coating) | Impact Number[1] | Break (B)/ No Break (NB) |
| ABS | — | 8[2] | NB |
| Impact PP | — | 40[3] | NB |
| PP | — | 83[4] | B |
| EAA | — | 83[5] | NB |
| PP | $Mg(OH)_2$(0) | 99 | B |
| PP | $Mg(OH)_2$(2) | 98[6] | B |
| PP | $Mg(OH)_2$(8) | 98[6] | B |
| PP | $Mg(OH)_2$(16) | 99[6] | B |

TABLE I-continued

Impact Resistance of Various Resin-Filler Combustions

| Resin | Filler (% Coating) | Impact Number[1] | Break (B)/ No Break (NB) |
|---|---|---|---|
| PP | Al(OH)$_3$(0) | 97 | B |
| PP | Al(OH)$_3$(2) | 98[6] | B |
| PP | Al(OH)$_3$(8) | 97[6] | B |
| PP | Al(OH)$_3$(16) | 96[6] | B |
| EAA | Mg(OH)$_2$(2) | 89 | B |
| EAA | Mg(OH)$_2$(8) | 90 | B |
| EAA | Mg(OH)$_2$(16) | 97 | B |
| EAA | Al(OH)$_3$(2) | 48 | NB |
| EAA | Al(OH)$_3$(8) | 23 | NB |
| EAA | Al(OH)$_3$(16) | 73 | B |

[1]Complete impact resistance = 0; zero impact resistance = 100
[2]Notched Izod impact strength at 22° C., 7.0 ft-lb/in.
[3]Notched Izod impact strength at 22° C., 5.0 ft-lb/in.
[4]Notched Izod impact strength at 22° C., 0.7 ft-lb/in.
[5]Izod impact value unknown; material is flexible and does not resist impace under test conditions.
[6]Filler loading is still 67 wt %, coating + resin = 33 wt %.

The data in Table I show that incorporation of filler lowers impact resistance of PP, and do not indicate that the rubbery filler coating has any effect. With EAA, coated Mg(OH)$^2$ still gives a brittle, weak material, while the EAA/Al(OH)$_3$ combination gives a relatively tough material, comparable to high impact PP. The EAA data show some variation in properties with coating level; at the highest level (16%) the weights of coating and resin are approximately 1:2, respectively.

A few mixtures of both particulate and fibrous fillers were tested; results are collated in Table II.

TABLE II

Impact Resistance of Fiber-Particulate-EAA Combinations

| EAA wt % | Fiber (wt %) | Filler (wt T) | Impact Number | Break (B)/ No Break (NB) |
|---|---|---|---|---|
| 33 | 26 × 5(17) | Al(OH)$_3$(50) | 18 | NB |
| 33 | 26 × 5(17) | Mg(OH)$_2$(50) | 76 | B |
| 33 | 103 × 1(7) | Al(OH)$_3$(60) | 11 | NB |
| 33 | 26 × 1(7) | Al(OH)$_3$(60) | 10 | NB |
| 33 | 103 × 5(7) | Al(OH)$_3$(60) | 9 | NB |

These data are particularly interesting. Mg(OH)$_2$ again produces a brittle material, even with 17% PVAF. Incorporation of 7% PVAF into the Al(OH)$_3$-EAA combination, on the other hand, produces a material with excellent impact resistance, better than EAA containing 30% PVAF. Even at levels of 60% Al(OH)$_3$, impact resistance is comparable to EAA filled with 50% PVAF or high impact ABS (cf. Table I).

Figure 2:
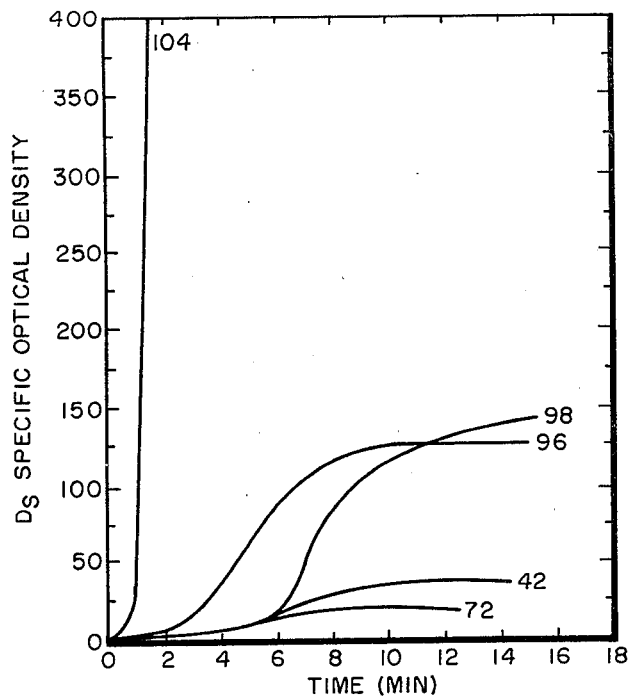
FIGS. 2 and 3 are a series of curves illustrating flaming and non-flaming smoke generation, respectively in a NBS SMOKE CHAMBER.
Figure 3:
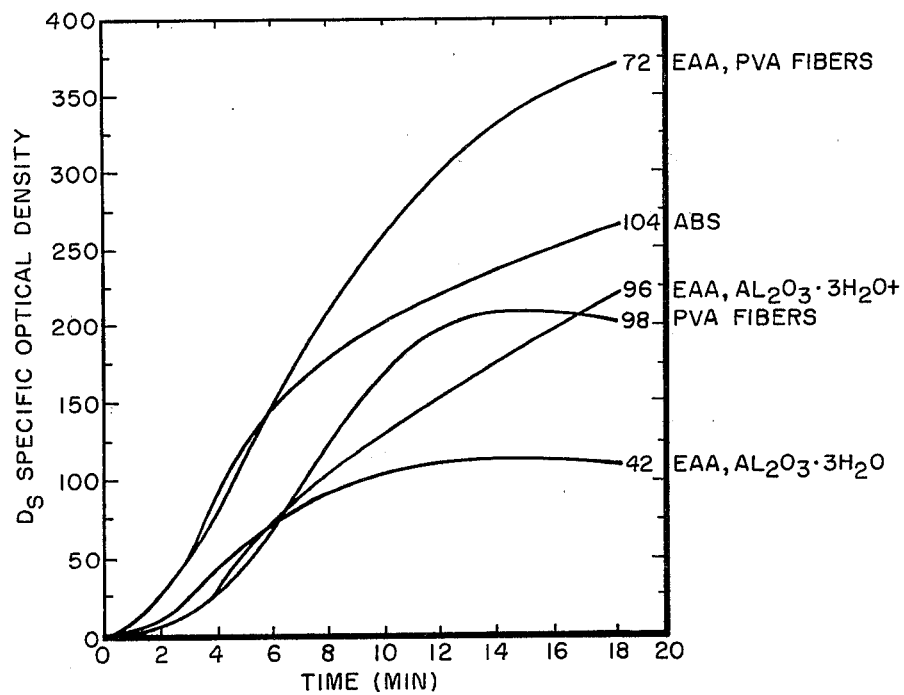

Turning now to smoke generation, five representative materials were tested under flaming and non-flaming conditions in the NBS smoke chamber. The data obtained are shown graphically in FIGS. 2 and 3. Sample compositions are as follows:

72. EAA 70 wt%, PVAF 30 wt%
104. ABS
96. EAA 33 wt%, PVAF 17 wt%, Al(OH)$_3$ 50 wt%
98. EAA 33 wt%, PVAF 7 wt%, Al(OH)$_3$ 60 wt%
47. EAA 28 wt%, coating 5 wt%, Al(OH)$_3$ 67 wt%

Examination of the graphs shows that, with the exception of ABS, substantially more smoke is evolved under non-flaming conditions than flaming. The EAA-Al(OH)$_3$ combination is best overall. It does not support combustion or drip. EAA-PVAF is best under flaming conditions and worst under non-flaming conditions. Under flaming conditions, it is completely consumed and drips, while under non-flaming conditions, a significant amount of char is formed. It is interesting to note that, under flaming conditions, Al(OH)$_3$-PVAF filler combinations produce more smoke than either filler alone. The reason for this behavior is not clear, but it is possible that under flaming conditions higher temperatures cause PVAF to decompose differently by evolving more water and forming less char than at lower temperatures. If this is the case, then catalysis of PVAF decomposition could yield a light weight composition that would give off low smoke under both flaming and non-flaming conditions. The similarities of PVA and cellulose suggest that some type of dehydration catalyst might be effective. In any case, fillers of Al(OH)$_3$ or Al(OH)$_3$-PVAF would seem to be good candidates for low smoking materials in transportation applications.

Ethylene-acrylic acid copolymer resin may be highly filled with alumina trihydrate to give a low smoking thermoplastic molding compound having good impact resistance. Coating the filler with a low modulus elastomer provides processability. Addition of polyvinyl alcohol fiber improves impact resistance at some sacrifice in maximum smoke produced. However, EAA containing 7 wt% PVAF and 60 wt% Al(OH)$_3$ (i.e., No. 98) produced the lowest smoke densities at 4 minutes, Ds$_4$:25 and 6 for nonflaming and flaming conditions, respectively. The significance of this result is that a minimum value of Ds$_4$ has been proposed for smoke standards because four minutes is considered to be a reasonable egress time from a compartment or room involved in a fire. The values measured for No. 98 are extremely low in comparison with other current materials. This composition also has very high impact resistance (Table II). (Current proposed FAA smoke standards are: Ds$_4$<200, Ds$_3$<100, and Ds$_3$<16). The use of coated magnesium hydroxide as a filler yielded a brittle material; the magnesium hydroxide has about 7× the surface area of the alumina trihydrate, which may account for the difference. Incorporation of elastomer coated filler in polypropylene caused a lowering of impact reistance.

It is to be understood that only preferred embodiments of the invention have been described and that numerous substitutions, alterations and modifications are all permissible without departing from the spirit or scope of the invention as defined in the following claims.

What is claimed is:

1. A fire retardant composite comprising:
    matrix resin containing a dispersion of:
    at least 60% by weight of basic, hydrated, particulate, mineral filler capable of evolving water at a temperature above 200° C. having an immobilized and insoluble coating of 1 to 20% by weight based on the filler of an elastomer compatible with the matrix resin having a lower modulus than the matrix resin and the elastomer contains acidic groups ionically cross-linking with the basic filler particles to attach the elastomer coating to the surface of the filler particles.

2. A composite according to claim 1 in which the matrix resin is a molding grade thermoplastic resin.

3. A composite according to claim 1 further including 1 to 10% by weight of reinforcing resin fibers that evolve at least 30% of their weight as water at a temperature above 200° C.

4. A composite according to claim 1 in which the filler is selected from Al(OH)$_3$ or Mg(OH)$_2$.

5. A composite according to claim 4 in which the acid substituent is selected phosphonic, sulfonic or carboxyl.

6. A composite according to claim 5 in which the elastomer is a copolymer containing 1 to 15% of acrylic acid.

7. A composite according to claim 6 in which the copolymer additionally contains a $C_2$ to $C_{12}$ alkyl acrylate.

8. A composite according to claim 7 in which the alkylacrylate is ethyl hexyl acrylate.

9. A fire retardant composite comprising: matrix resin consisting essentially of ethylene-acrylic acid copolymer containing 1 to 10% by weight vinyl acetate and said matrix resin containing a dispersion of:

at least 60% by weight of particulate, mineral, hydrated filler capable of evolving water at a temperature above 200° C. having a coating of 1 to 20% by weight of an elastomer containing an acidic substituent compatible with the matrix resin.

* * * * *